United States Patent
Hayashi et al.

(10) Patent No.: US 11,161,563 B2
(45) Date of Patent: Nov. 2, 2021

(54) GUARD STRUCTURE FOR SADDLE RIDING VEHICLE

(71) Applicant: HONDA MOTOR CO., LTD., Tokyo (JP)

(72) Inventors: Takazumi Hayashi, Wako (JP); Hiroshi Okamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 16/597,039

(22) Filed: Oct. 9, 2019

(65) Prior Publication Data
US 2020/0164942 A1 May 28, 2020

(30) Foreign Application Priority Data
Nov. 28, 2018 (JP) .............................. JP2018-221962

(51) Int. Cl.
| | |
|---|---|
| B62J 27/00 | (2020.01) |
| B62J 27/30 | (2020.01) |
| B62J 23/00 | (2006.01) |
| B62K 11/04 | (2006.01) |
| B62K 19/32 | (2006.01) |

(52) U.S. Cl.
CPC .............. *B62J 27/00* (2013.01); *B62K 11/04* (2013.01); *B62K 19/32* (2013.01)

(58) Field of Classification Search
CPC ............. B62J 27/30; B62J 23/00; B62J 27/00
USPC ........................................................ 180/219
See application file for complete search history.

(56) References Cited

FOREIGN PATENT DOCUMENTS

| | | | |
|---|---|---|---|
| CN | 102806960 A | * | 12/2012 |
| CN | 102806960 A |  | 12/2012 |
| CN | 107985479 A |  | 5/2018 |
| JP | 2002-068059 |  | 3/2002 |
| JP | 2013-112293 A |  | 6/2013 |

OTHER PUBLICATIONS

Indian Office Action dated Nov. 25, 2020, 5 pages.
Japanese Office Action dated Jun. 30, 2020, with English translation, 7 pages.
Chinese Office Action dated Dec. 29, 2020, 7 pages.

* cited by examiner

*Primary Examiner* — Minnah L Seoh
*Assistant Examiner* — Hosam Shabara
(74) *Attorney, Agent, or Firm* — Rankin, Hill & Clark LLP

(57) ABSTRACT

The guard structure for a saddle riding vehicle includes a body frame, a guard member fixed to the body frame and guarding a vehicle body, a stay connecting the guard member to the body frame. The stay includes a frame connection section connected to the body frame side, a guard member connection section connected to the guard member, and a linking section that connect the frame connection section and the guard member connection section. The stay is formed in a U shape by the frame connection section and the guard member connection section, which are disposed to face each other, and the linking section.

10 Claims, 12 Drawing Sheets

GUARD STRUCTURE FOR SADDLE RIDING VEHICLE

INCORPORATION BY REFERENCE

The present application claims priority under 35 U.S.C. § 119 to Japanese Patent Application No. 2018-221962 filed on Nov. 28, 2018. The content of the application is incorporated herein by reference in its entirety.

TECHNICAL FIELD

The present invention relates to a guard structure for a saddle riding vehicle.

BACKGROUND ART

Conventionally, in a saddle riding vehicle, there has been known a configuration in which a guard member for guarding a vehicle body such as an engine is connected to a body frame through a stay provided at an end of the guard member (see, for example, Patent Document 1). In Patent Document 1, the stay is a flat plate-like body interposed between a rod-shaped main end portion of the guard member and the body frame.
Therefore, the guard member is fixed to the body frame with a comparatively high mounting rigidity.

PRIOR ART DOCUMENT

Patent Document

[Patent Document 1]
Japanese Patent Laid-open No. 2002-68059

SUMMARY OF THE INVENTION

Problem to be Solved by the Invention

In the case where the guard member is firmly fixed to the body from as in above-mentioned related art, however, the rigidity of the body frame may be made excessively high by the guard member.
The present invention has been made in light of the above circumstance and has a purpose to provide a guard structure for a saddle riding vehicle by which the rigidity of a body frame can be made suitable.

Means for Solving the Problem

There is provided a guard structure for a saddle riding vehicle, including a body frame (10), a guard member (50) fixed to the body frame (10) and guarding a vehicle body, and a stay (53L, 53R) connecting the guard member (50) to the body frame (10), in which the stay (53L, 53R) includes a frame connection section (70, 270) connected to a side of the body frame (10), a guard member connection section (71, 271) connected to the guard member (50), and a linking section (72, 272) connecting the frame connection section (70, 270) and the guard member connection section (71, 271), and the stay (53L, 53R) is formed in a U shape by the frame connection section (70, 270) and the guard member connection section (71, 271), which are disposed to face each other, and the linking section (72, 272).
In the above configuration, a boss section (73, 273) extending from an inner surface of one of the frame connection section (70, 270) and the guard member connection section (71, 271) to an inner surface of the other frame connection section (70, 270) and the guard member connection section (71, 271) may be provided, and a gap (77, 277) may be provided between a tip (73b, 273b) of the boss section (73, 273) and the inner surface of the other frame connection section (70, 270) and the guard member connection section (71, 271).
In the above configuration, the guard member (50) may include a rod-shaped guard main body section (63, 263), and a mounting section (62, 262) provided at an end of the guard main body section (63, 263) and fixed to the guard member connection section (71, 271), and a base section (63e, 263e) of the guard main body section (63, 263) with respect to the mounting section (62, 262) may overlap with the boss section (73, 273) at least partly as viewed in an axial direction of the boss section (73, 273).
In the above configuration, the guard member (50) may include at least either one of a side guard (55L, 55R) provided on a lateral side of a front portion of the body frame (10), or an engine guard (52L, 52R) provided on a lateral side of an engine (11) of the saddle riding vehicle.
In the above configuration, the side guard (55L, 55R) may be disposed above the engine guard (52L, 52R), the guard member (50) may include a side guard lower-side mounting section (58, 258) that fixes a lower portion of the side guard (55L, 55R) to the stay (53L, 53R), and an engine guard upper-side mounting section (62, 262) that fixes an upper portion of the engine guard (52L, 52R) to the stay (53L, 53R), and the side guard lower-side mounting section (58, 258) and the engine guard upper-side mounting section (62, 262) may be co-fastened to the same stay (53L, 53R).
In the above configuration, the side guard (55L, 55R) and the engine guard (52L, 52R) may overlap with each other in front view of the vehicle.
In the above configuration, the body frame (10) may include a head pipe (16), a main frame (17) extending rearward from the head pipe (16), and a down frame (19) extending downward from the head pipe (16), a pair of the stays (53L, 53R) may be provided on left and right sides of the down frame (19), and may be each disposed in such an orientation that the linking section (72, 272) constituting a bottom portion of the U shape faces in a longitudinal vehicle direction, and the left and right stays (53L, 53R) may be fastened to the down frame (19) by a pair of upper and lower fastening members (67a, 67b) that penetrate the frame connection section (70, 270) and the down frame (19) in a left-right direction.
In the above configuration, the body frame (10) may include a head pipe (16), a main frame (17) extending rearward from the head pipe (16), and a down frame (19) extending downward from the head pipe (16), a pair of the stays (53L, 53R) may be provided on left and right sides of the down frame (19), and may be each disposed in such an orientation that the linking section (72, 272) constituting a bottom portion of the U shape faces in a longitudinal vehicle direction, the left and right stays (53L, 53R) may be fastened to the down frame (19) by a pair of upper and lower fastening members (67a, 67b) that penetrate the frame connection section (70, 270) and the down frame (19) in a left-right direction, and the boss section (73, 273) and the base section (63e, 263e) may be provided between the upper and lower fastening members (67a, 67b) in side view of the vehicle.
In the above configuration, the body frame (10) may include a head pipe (16), a main frame (17) extending rearward from the head pipe (16), and a down frame (19) extending downward from the head pipe (16), the guard member (50) may include a side guard upper-side mounting section (57b) that fixes an upper portion of the side guard (55L, 55R) to the body frame (10), and an engine guard lower-side mounting section (64, 264) that fixes a lower portion of the engine guard (52L, 52R) to the body frame (10), and the side guard upper-side mounting section (57b) may be fixed to the head pipe (16), while the engine guard lower-side mounting section (64, 264) may be fixed to a part of the body frame (10) which is located on a rear side relative to the down frame (19).

In the above configuration, the stay (53L, 53R) may be fixed to the down frame (19) between the side guard upper-side mounting section (57b) and the engine guard lower-side mounting section (64, 264).

In the above configuration, an engine hanger (66) that supports an engine (11) of the saddle riding vehicle may be fastened to the body frame (10), and the stay (53L, 53R) may be co-fastened to the body frame (10) together with the engine hanger (66).

Effects of the Invention

The guard structure for a saddle riding vehicle includes the body frame, the guard member fixed to the body frame and guarding the vehicle body, and the stay connecting the guard member to the body frame, in which the stay includes the frame connection section connected to the body frame side, the guard member connection section connected to the guard member, and the linking section connecting the frame connection section and the guard member connection section, and the stay is formed in the U shape by the frame connection section and the guard member connection section, which are disposed to face each other, and the linking section.

According to this configuration, since the stay is U-shaped and can be bent appropriately, the rigidity of the body frame can be prevented from being excessively high by the guard member. Therefore, even in the configuration in which the guard member is provided, the rigidity of the body frame can be made suitable.

In the above configuration, the boss section extending from the inner surface of one of the frame connection section and the guard member connection section to the inner surface of the other frame connection section and the guard member connection section may be provided, and the gap may be provided between the tip of the boss section and the inner surface of the other frame connection section and the guard member connection section.

According to this configuration, although the stay is deformed in an amount corresponding to the gap between the tip of the boss section and the inner surface of the other of the frame connection section and the guard member connection section, deformation of the stay is restricted by the boss section in a state in which the gap is eliminated. Therefore, the rigidity of the body frame can be made suitable by utilizing the deformation of the stay, and deformation of the stay can be prevented in the case where a large external force is exerted on the guard member.

In the above configuration, the guard member may include the rod-shaped guard main body section, and the mounting section provided at an end of the guard main body section and fixed to the guard member connection section, and the base section of the guard main body section with respect to the mounting section may overlap with the boss section at least partly as viewed in the axial direction of the boss section.

According to this configuration, the base section of the guard main body section can be received by the boss section, and, therefore, an external force transmitted from the guard main body section to the stay can be effectively received by the boss section.

In the above configuration, the guard member may include at least either one of the side guard provided on a lateral side of the front portion of the body frame, or the engine guard provided on a lateral side of the engine of the saddle riding vehicle.

According to this configuration, the front portion of the body frame and the engine can be protected from lateral sides, and the rigidity of the front portion of the body frame can be made suitable, by the guard member.

In the above configuration, the side guard may be disposed above the engine guard, the guard member may include the side guard lower-side mounting section that fixes the lower portion of the side guard to the stay, and the engine guard upper-side mounting section that fixes the upper portion of the engine guard to the stay, and the side guard lower-side mounting section and the engine guard upper-side mounting section may be co-fastened to the same stay.

According to this configuration, the stay can be shared by the side guard and the engine guard, so that the number of component parts can be reduced.

In the above configuration, the side guard and the engine guard may overlap with each other in front view of the vehicle.

According to this configuration, the side guard and the engine guard are located close to each other, and, therefore, the stay is easily shared by the side guard and the engine guard.

In the above configuration, the body frame may include the head pipe, the main frame extending rearward from the head pipe, and the down frame extending downward from the head pipe, a pair of the stays may be provided on left and right sides of the down frame, and may be each disposed in such an orientation that the linking section constituting a bottom portion of the U shape faces in a longitudinal vehicle direction, and the left and right stays may be fastened to the down frame by the pair of upper and lower fastening members that penetrate the frame connection section and the down frame in the left-right direction.

According to this configuration, the left and right stays can be firmly fixed to the down frame by the pair of upper and lower fastening members that penetrate the frame connection section and the down frame in the left-right direction.

In the above configuration, the body frame may include the head pipe, the main frame extending rearward from the head pipe, and the down frame extending downward from the head pipe, a pair of the stays may be provided on left and right sides of the down frame, and may be each disposed in such an orientation that the linking section constituting the bottom portion of the U shape faces in the longitudinal vehicle direction, the left and right stays may be fastened to the down frame by a pair of upper and lower fastening members that penetrate the frame connection section and the down frame in the left-right direction, and the boss section and the base section may be provided between the upper and lower fastening members in side view of the vehicle.

According to this configuration, an external force acting on the guard member is transmitted to the upper and lower fastening members through the boss section. Therefore, the moment due to the external force can be restrained from acting strongly.

In the above configuration, the body frame may include the head pipe, the main frame extending rearward from the head pipe, and the down frame extending downward from the head pipe, the guard member may include the side guard upper-side mounting section that fixes the upper portion of the side guard to the body frame, and the engine guard lower-side mounting section that fixes the lower portion of the engine guard to the body frame, and the side guard upper-side mounting section may be fixed to the head pipe, while the engine guard lower-side mounting section may be fixed to a part of the body frame which is located on the rear side relative to the down frame.

According to this configuration, the rigidity of the body frame ranging from the head pipe to that part of the body frame which is located on the rear side relative to the down frame can be made suitable.

In the above configuration, the stay may be fixed to the down frame between the side guard upper-side mounting section and the engine guard lower-side mounting section.

According to this configuration, since the stay is located between the side guard upper-side mounting section and the engine guard lower-side mounting section, the body frame can be provided with a suitable rigidity over a wide range thereof.

In the above configuration, the engine hanger that supports the engine of the saddle riding vehicle may be fastened to the body frame, and the stay may be co-fastened to the body frame together with the engine hanger.

According to this configuration, the stay can be fixed to the body frame with a simple structure by utilizing the fastening section of the engine hanger.

MODE FOR CARRYING OUT THE INVENTION

Figure 1:
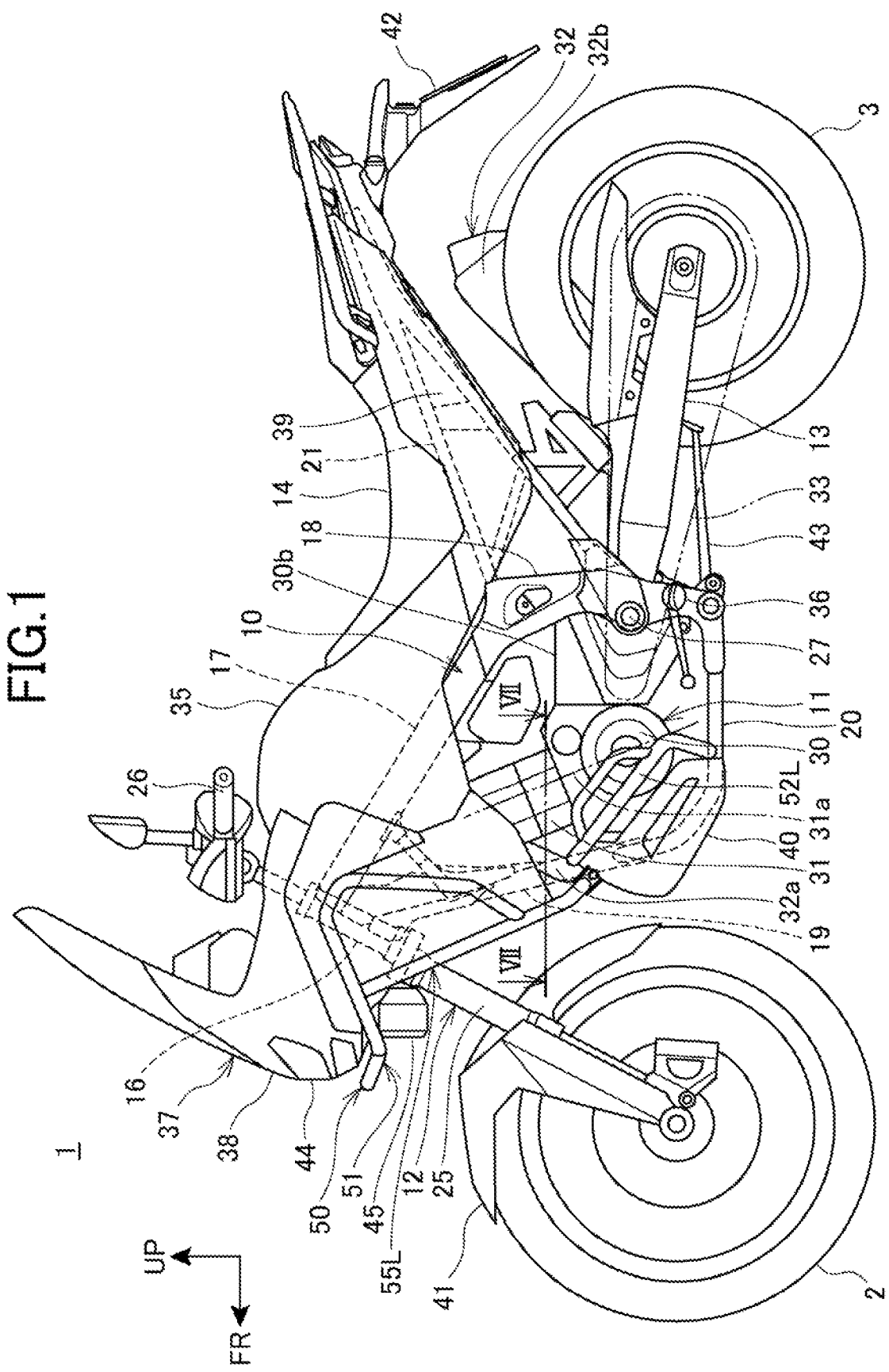
FIG. 1 is a left side view of a motorcycle according to an embodiment of the present invention.

An embodiment of the present invention will be described below, referring to the drawings. In the description, the directions such as forward, rearward, leftward, rightward, upward and downward directions are the same as the directions with respect to the vehicle body, unless otherwise specified. In the drawings, a symbol FR indicates the front side of the vehicle body, a symbol UP indicates the upper side of the vehicle body, and a symbol LH indicates the left-hand side of the vehicle body.

FIG. 1 is a left side view of a motorcycle according to an embodiment of the present invention.

The motorcycle 1 is a vehicle in which an engine 11 as a power unit is supported on a body frame 10, a steering system 12 supporting a front wheel 2 in a steerable manner is supported on a front end of the body frame 10 in a steerable manner, and a swing arm 13 supporting a rear wheel 3 is provided at a rear portion of the body frame 10.

The motorcycle 1 is a saddle riding vehicle in which a rider is seated astride a seat 14, and the seat 14 is provided on an upper side of a rear portion of the body frame 10.

Figure 2:
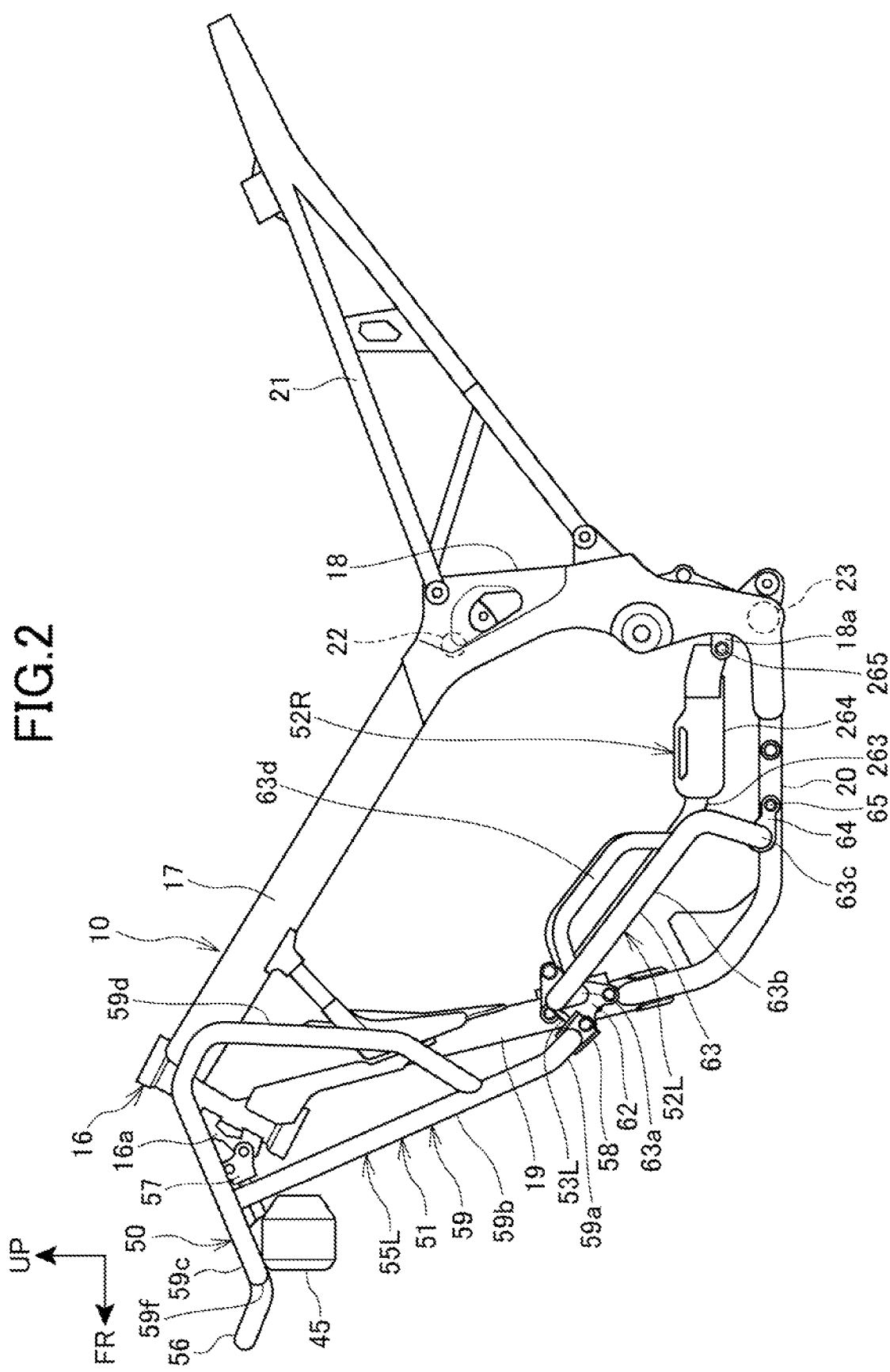
FIG. 2 is a left side view of a body frame.
Figure 3:
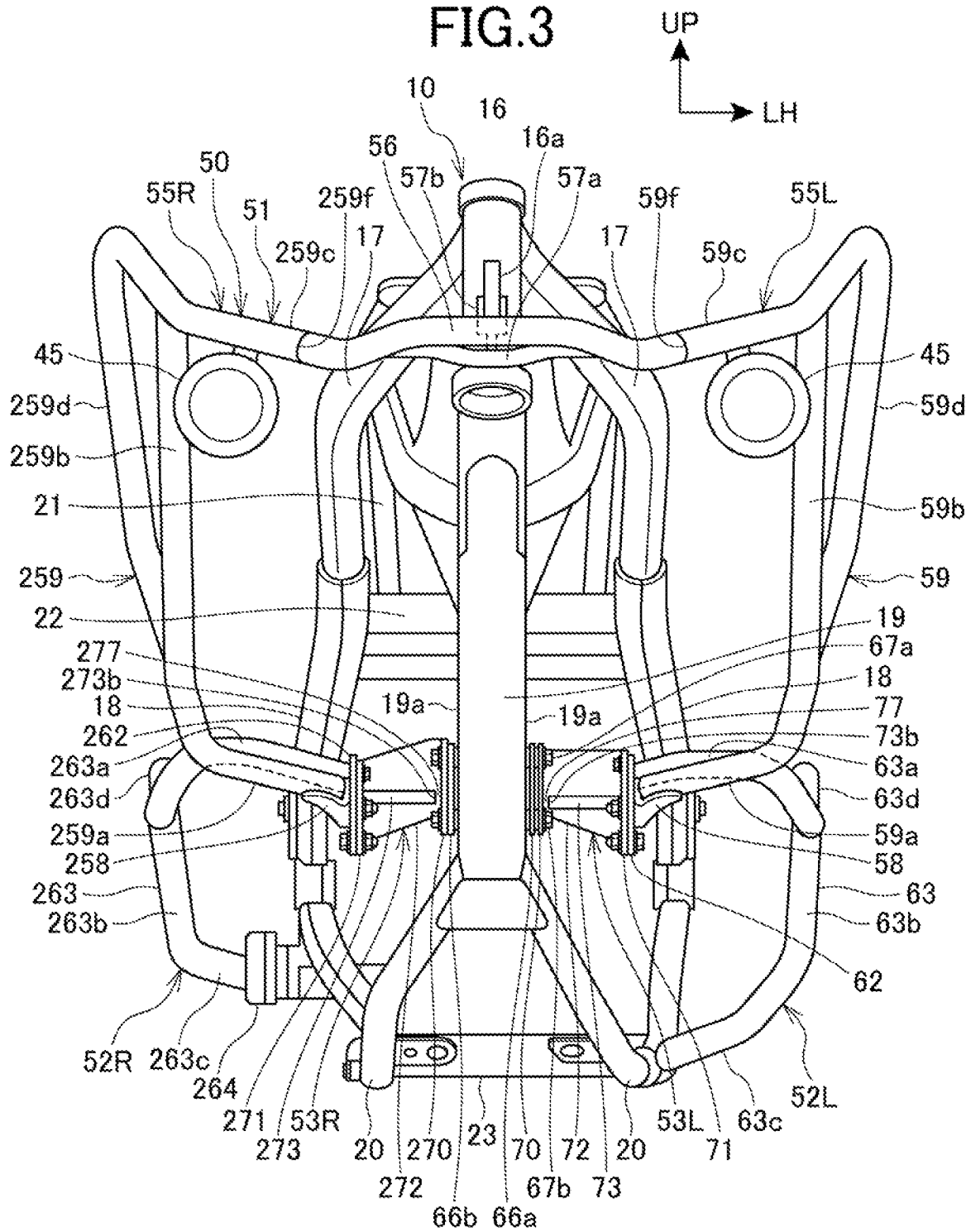
FIG. 3 is a front view of the body frame as viewed from the front side.

FIG. 2 is a left side view of the body frame 10. FIG. 3 is a front view of the body frame 10 as viewed from the front side. In FIGS. 2 and 3, a guard member 50 which will be described later is illustrated together with the body frame 10.

Referring to FIGS. 1 to 3, the body frame 10 includes a head pipe 16, a pair of left and right main frames 17, a pair of left and right pivot frames 18, a down frame 19, a pair of left and right lower frames 20, and a seat frame 21.

In addition, the body frame 10 includes an upper cross member 22 connecting upper end portions of the left and right pivot frames 18 in the transverse direction (vehicle width direction), and a lower cross member 23 connecting lower end portions of the left and right pivot frames 18 in the transverse direction.

More in detail, the head pipe 16 is provided at a front end of the body frame 10, and is located in the center of the vehicle width.

The left and right main frames 17 extend rearwardly downward from the head pipe 16.

The left and right pivot frames 18 extend downward from rear ends of the main frames 17.

The down frame 19 singly extends downward from a position of the head pipe 16 which is on a lower side of the main frames 17, and is located in the center of the vehicle width.

The left and right lower frames 20 are branched to the left and right sides from a lower end portion of the down frame 19, respectively extend rearward, and are connected to lower end portions of the pivot frames 18.

The seat frame 21 extends rearwardly upward from upper portions of the pivot frames 18.

The lower frames 20 and the pivot frames 18 are those portions of the body frame 10 which are located on the rear side relative to the down frame 19.

The steering system 12 includes a pair of left and right front forks 25 steerably provided through a steering shaft (not illustrated) rotatably supported on the head pipe 16, and a handlebar 26 attached to upper end portions of the front forks 25. The front wheel 2 is rotatably supported on lower end portions of the front forks 25.

The swing arm 13 has a front end portion rotatably supported by a pivot shaft 27 connecting the left and right pivot frames 18 in the transverse direction, and is swung upward and downward with the pivot shaft 27 as a center. The rear wheel 3 is rotatably supported on a rear end portion of the swing arm 13.

The engine 11 is disposed between the main frames 17 and the lower frames 20, and between the down frame 19 and the pivot frames 18, in side view of the vehicle, and is supported by the body frame 10.

The engine 11 includes a crankcase 30 that supports a crankshaft (not illustrated) extending horizontally in the transverse direction (left-right direction), and a cylinder section 31 extending upward from a front portion of the crankcase 30. A cylinder axis 31a of the cylinder section 31 is tilted forward relative to the vertical.

An intake device (not illustrated) of the engine 11 is connected to an intake port at a rear surface of the cylinder section 31.

An exhaust device 32 of the engine 11 includes an exhaust pipe 32a connected to an exhaust port at a front surface of the cylinder section 31, and a muffler 32b connected to a downstream end of the exhaust pipe 32a.

The exhaust pipe 32a extends downward from the exhaust port, and extends rearward by passing on the lower side of the engine 11. The muffler 32b is disposed on an outer side of the rear wheel 3.

A rear portion of the crankcase 30 is a transmission case section 30b in which a transmission is accommodated.

An output power of the engine 11 is transmitted to the rear wheel 3 by a drive chain 33 that connects an output shaft of the transmission and the rear wheel 3.

The seat 14 is supported from below by the seat frame 21.

A fuel tank 35 is disposed between the head pipe 16 and the seat 14, and is supported by the main frames 17 on an upper side of the engine 11.

A pair of left and right steps 36 on which the driver's feet are put are provided at lower end portions of the pivot frames 18.

The motorcycle 1 includes a body cover 37 that covers the vehicle body such as the body frame 10 and the engine 11. The body cover 37 includes a front cover 38 that covers the head pipe 16 and an upper portion of the steering system 12 from the front side and lateral sides, a rear cover 39 that covers the seat frame 21 on a lower side of the seat 14, and an under cover 40 that covers a lower portion of the engine 11 from the front side.

A front surface portion of the front cover 38 covers the head pipe 16 and an upper portion of the steering system 12 from the front side. Side surface portions of the front cover 38 cover the head pipe 16, an upper portion of the steering system 12, the down frame 19 and the like from lateral sides.

In addition, the motorcycle 1 includes a front fender 41 which covers the front wheel 2 from the upper side, a rear fender 42 which covers the rear wheel 3 from the upper side, and a stand 43.

A headlight 44 is provided at the front cover 38.

The motorcycle 1 includes a guard member 50 that guards the vehicle body.

The guard member 50 includes a front section guard 51 that is provided at a front portion of the vehicle body, and a pair of left and right engine guards 52L and 52R provided on lateral sides of the engine 1.

The guard member 50 is fixed to the body frame 10 by a pair of left and right stays 53L and 53R.

The stay 53L on one side (left side) of the left and right sides is fixed to a left side surface of the down frame 19, and extends toward a transverse-directionally outer side from the down frame 19.

The stay 53R on the other side (right side) of the left and right sides is fixed to a right side surface of the down frame 19, and extends toward a transverse-directionally outer side from the down frame 19.

Figure 4:
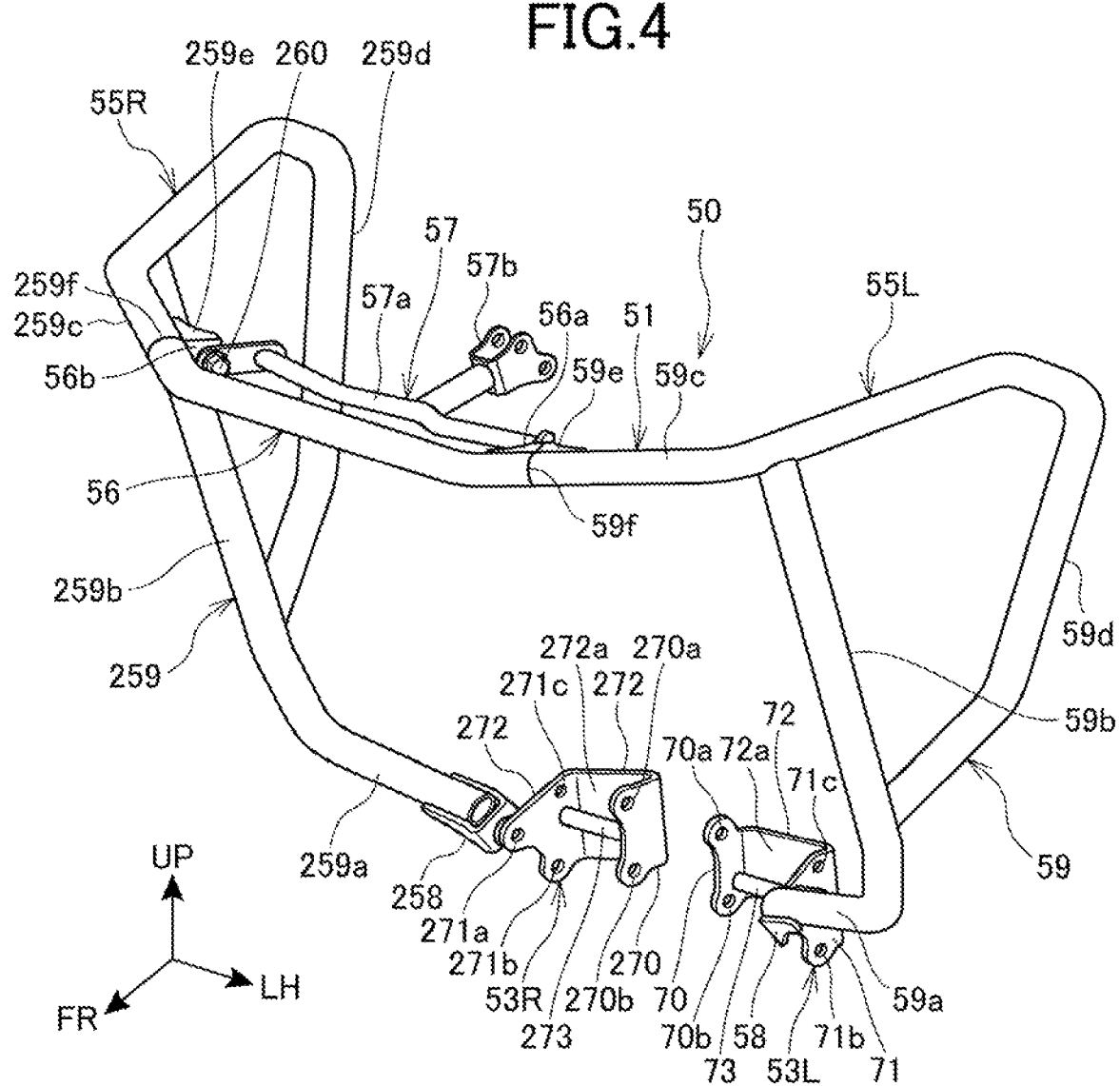
FIG. 4 is a perspective view of a front section guard as viewed from a front side.

FIG. 4 is a perspective view of the front section guard 51 as viewed from a front side.

Referring to FIGS. 1 to 4, the front section guard 51 includes a pair of left and right side guards 55L and 55R provided on left and right sides of a front end portion of the vehicle body, a front guard 56 connecting the side guards 55L and 55R in a left-right direction, and a support member 57 provided at an upper portion of the front section guard 51.

The side guards 55L and 55R are provided substantially in left-right symmetry.

The side guards 55L and 55R cover side surface portions of the front cover 38 from outer sides.

The side guard 55L on one side (left side) of the left and right sides includes a side guard lower-side mounting section 58 fixed to the stay 53L, and a rod-shaped side guard main body section 59.

The side guard main body section 59 includes a lower-side side extension section 59a extending from the side guard lower-side mounting section 58 toward a transverse-directionally outer side, an upward extension section 59b extending upward from the lower-side side extension section 59a, and an upper-side side extension section 59c extending from an upper end of the upward extension section 59b toward a transverse-directionally inner side.

In addition, the side guard main body section 59 includes a rearward extension section 59d which extends rearward from an upper end of the upward extension section 59b, turns back toward a front lower side, and is connected to a lower portion of the upward extension section 59b.

Figure 5:
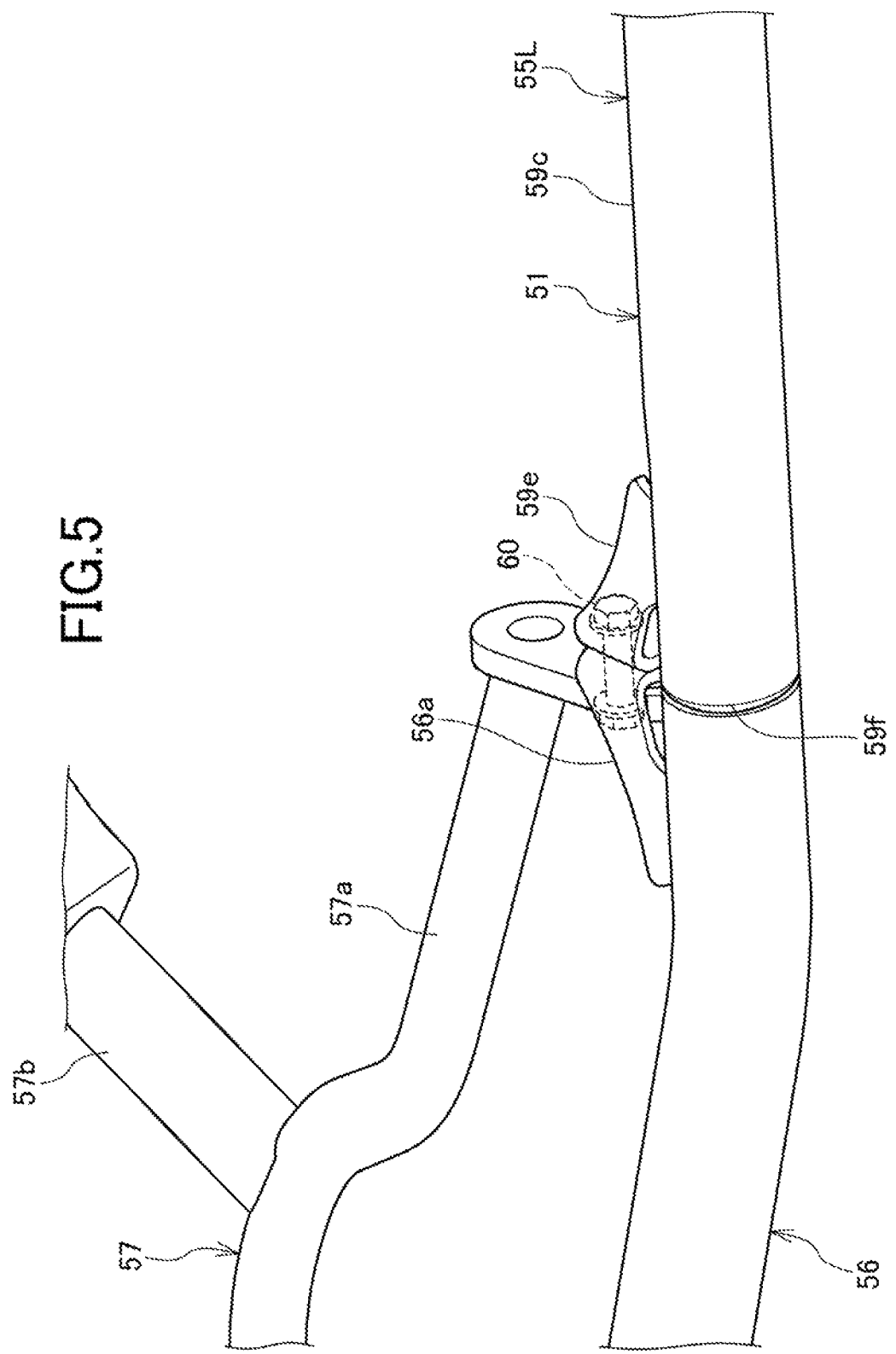
FIG. 5 is a perspective view of a connection section between a side guard and a front guard.

FIG. 5 is a perspective view of a connection section between the side guard 55L and the front guard 56.

Referring to FIGS. 4 and 5, a fixing piece 59e is provided at a rear surface of an end portion of the upper-side side extension section 59c of the side guard main body section 59. In and through the fixing piece 59e, a fixture 60 that connects the side guard 55L to the front guard 56 is inserted and passed.

The side guard 55R on the other side (right side) of the left and right sides includes a side guard lower-side mounting section 258 fixed to the stay 53R, and a rod-shaped side guard main body section 259.

The side guard main body section 259 includes a lower-side side extension section 259a extending from the side guard lower-side mounting section 258 toward a transverse-directionally outer side, an upward extension section 259b extending upward from the lower-side side extension section 259a, and an upper-side side extension section 259c extending from an upper end of the upward extension section 259b toward a transverse-directionally inner side.

In addition, the side guard main body section 259 includes a rearward extension section 259d which extends rearward from an upper end of the upward extension section 259b, turns back toward a front lower side, and is connected to a lower portion of the upward extension section 259b.

Referring to FIG. 4, a fixing piece 259e is provided at a rear surface of an end portion of the upper-side side extension section 259c of the side guard main body section 259. In and through the fixing piece 259e, a fixture 260 that connects the side guard 55L to the front guard 56 is inserted and passed.

A pair of left and right foglamps 45 (FIG. 3) are supported by the upper-side side extension sections 59c and 259c.

Referring to FIGS. 4 and 5, the front guard 56 is a rod-shaped member extending in the transverse direction. The front guard 56 is located on a front side of a front surface portion of the front cover 38.

A fixing piece 56a fixed to the fixing piece 59e of the side guard 55L is provided at a rear surface of one end portion of the front guard 56.

A fixing piece 56b fixed to the fixing piece 259e of the side guard 55R is provided at a rear surface of the other end portion of the front guard 56.

The one end portion of the front guard 56 is fitted to an end portion 59f of the upper-side side extension section 59c of the side guard 55L, and is fixed to the side guard 55L by the fixing piece 59e and the fixture 60 inserted in and passed through the fixing piece 56a.

The other end portion of the front guard 56 is fitted to an end portion 259f of the upper-side side extension section 259c of the side guard 55R, and is fixed to the side guard 55R by the fixing piece 259e and the fixture 260 inserted in and passed through the fixing piece 56b.

The support member 57 includes a rod-shaped left-right extension section 57a extending in the transverse direction, and a side guard upper-side mounting section 57b extending rearward from an intermediate portion in regard of the left-right direction of the left-right extension section 57a.

The left-right extension section 57a extends in the transverse direction substantially in parallel to the front guard 56, on a rear side of the front guard 56.

The left-right extension section 57a has a transverse-directionally one end portion co-fastened to the fixing piece 56a of the front guard 56 by the fixture 60.

The left-right extension section 57a has the transverse-directionally other end portion co-fastened to the fixing piece 56b of the front guard 56 by the fixture 260.

As depicted in FIG. 2, the body frame 10 includes a stay section 16a at a front surface of the head pipe 16.

Referring to FIGS. 2 and 4, an upper portion of the front section guard 51 is supported on the body frame 10, by fixation of the side guard upper-side mounting section 57b of the support member 57 to the stay section 16a.

The side guard upper-side mounting section 57b is fastened to the stay section 16a by a fixture 61 which is inserted and passed in the transverse direction.

Specifically, the side guards 55L and 55R provided as one body with the front guard 56 of the front section guard 51 have upper portions fixed to the body frame 10 through the side guard upper-side mounting section 57b.

Figure 6:
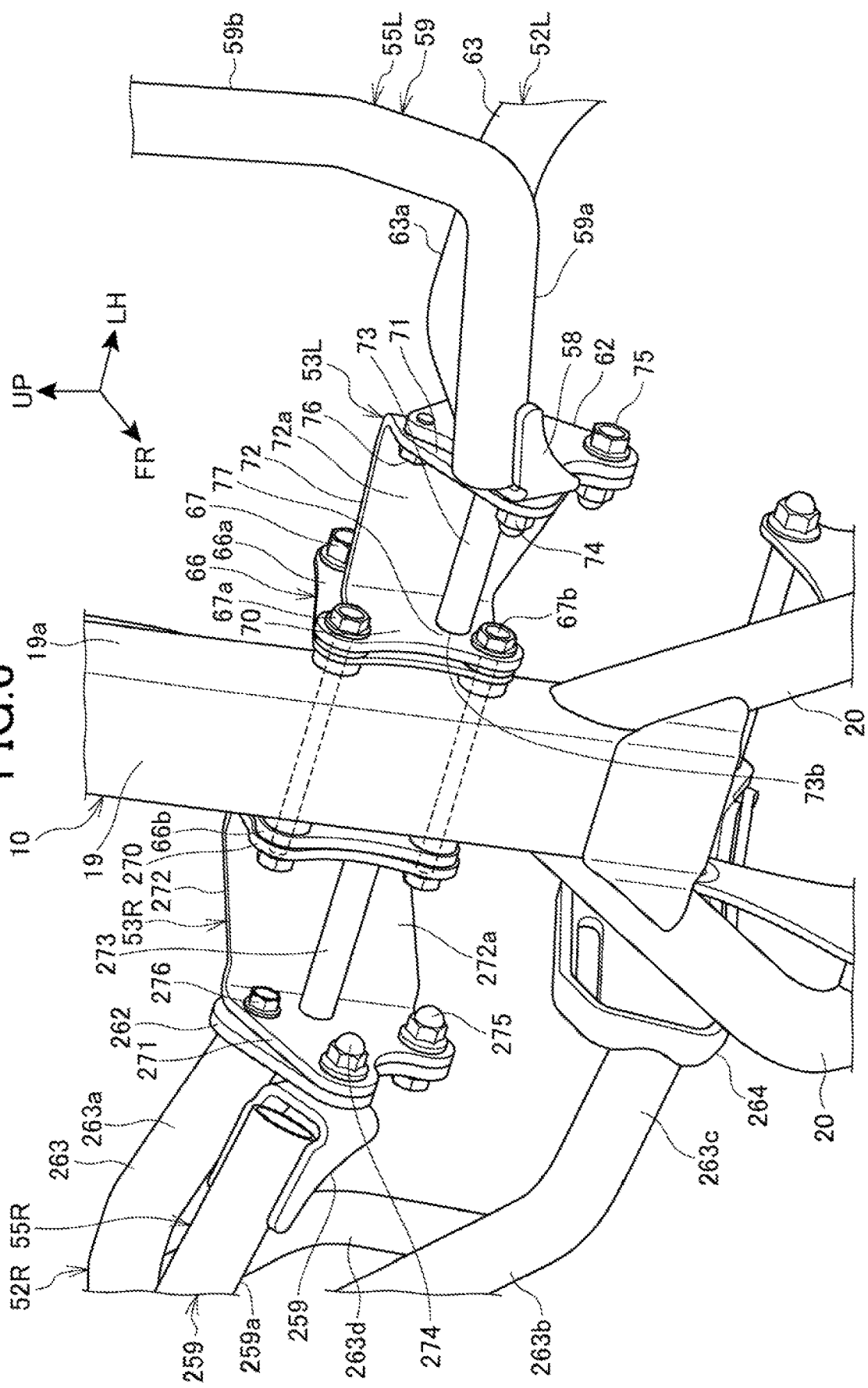
FIG. 6 is a perspective view of a fixing structure for fixing the side guard and an engine guard to stays as viewed from a front side.

FIG. 6 is a perspective view of a fixing structure for fixing the side guards 55L and 55R and the engine guards 52L and 52R to the stays 53L and 53R as viewed from a front side.

Referring to FIGS. 1 to 3 and 6, the engine guards 52L and 52R cover a front portion of the crankcase 30 of the engine 11 from lateral sides.

The engine guard 52L on one side (left side) of the left and right sides includes an engine guard upper-side mounting section 62 (mounting section) fixed to the stay 53L, a rod-shaped guard main body section 63, and an engine guard lower-side mounting section 64 fixed to the lower frame 20 on the left side.

The guard main body section 63 includes an upper-side side extension section 63a extending from the engine guard upper-side mounting section 62 toward the transverse-directionally outer side, a downward extension section 63b extending rearwardly downward from the upper-side side extension section 63a, and a lower-side side extension section 63c extending from a lower end of the downward extension section 63b toward the transverse-directionally inner side and connected to the engine guard lower-side mounting section 64.

In addition, the guard main body section 63 includes a reinforcement member 63d extending rearwardly downward from an upper end portion of the downward extension section 63b and connected to a lower end portion of the downward extension section 63b.

The engine guard lower-side mounting section 64 is a plate-shaped member along an outer side surface of the lower frame 20 on the left side.

A lower portion of the engine guard 52L is fastened to the lower frame 20 on the left side by a fixture 65 inserted in and passed through the engine guard lower-side mounting section 64 from a transverse-directionally outer side.

The engine guard 52R on the other side (right side) of the left and right sides includes an engine guard upper-side mounting section 262 (mounting section) fixed to the stay 53R, a rod-shaped guard main body section 263, and an engine guard lower-side mounting section 264 fixed to the pivot frame 18 on the right side.

The guard main body section 263 includes an upper-side side extension section 263a extending from the engine guard upper-side mounting section 262 toward the transverse-directionally outer side, a downward extension section 263b extending rearwardly downward from the upper-side side extension section 263a, and a lower-side side extension section 263c extending from a lower end of the downward extension section 263b toward the transverse-directionally inner side and connected to the engine guard lower-side mounting section 264.

Besides, the guard main body section 263 includes a reinforcement member 263d extending rearwardly downward from an upper end portion of the downward extension section 263b and connected to a lower end portion of the downward extension section 263b.

The engine guard lower-side mounting section 264 is a plate member extending rearward from an end of the lower-side side extension section 263c toward the pivot frame 18 on the right side. A lower stay 18a (FIG. 2) is provided at a lower portion of the pivot frame 18 on the right side.

A lower portion of the engine guard 52R is fastened to the lower stay 18a of the pivot frame 18 on the right side, by a fixture 265 inserted in and passed through the engine guard lower-side mounting section 264 from the transverse-directionally outer side.

Figure 7:
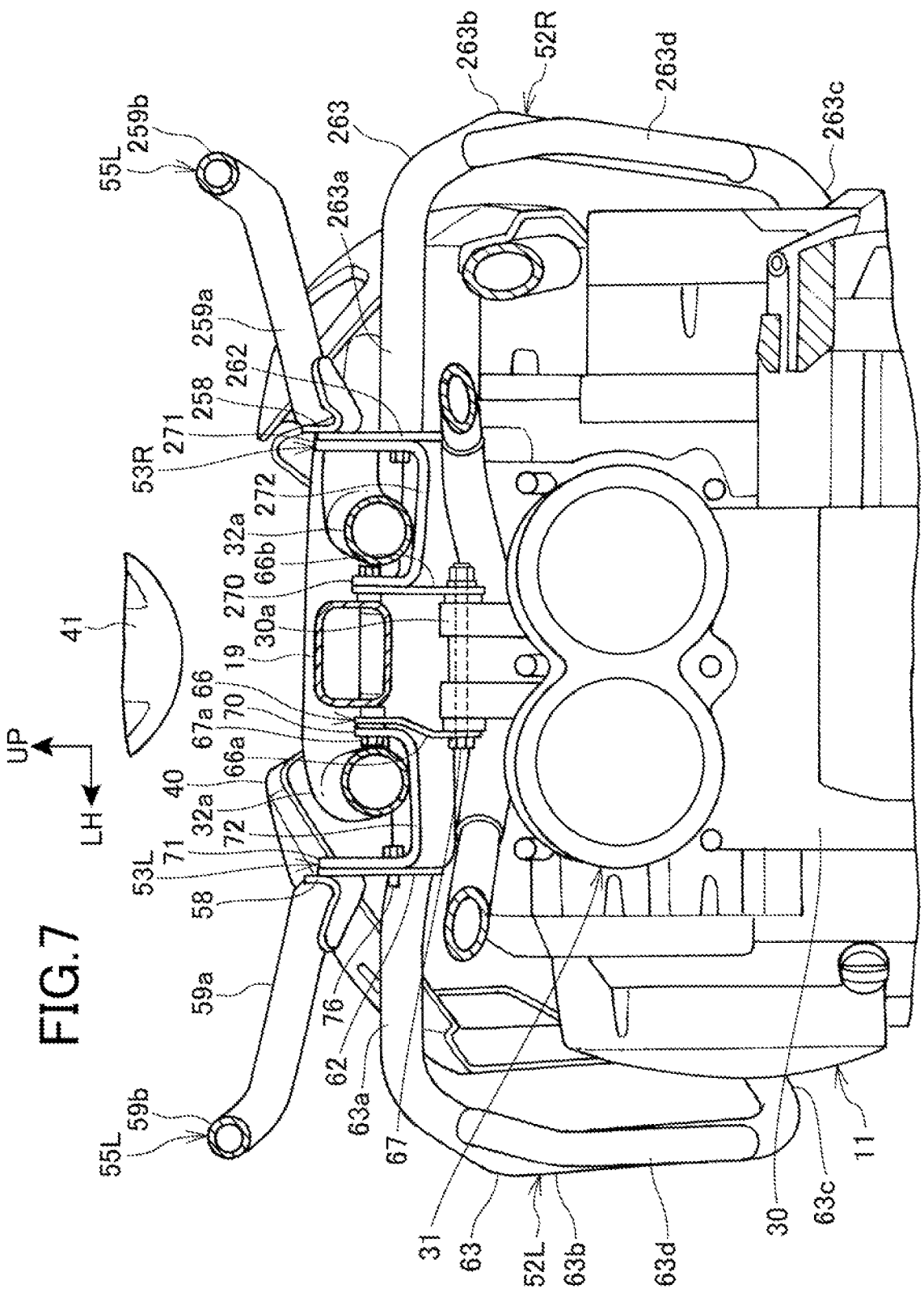
FIG. 7 is a sectional view taken along line VII-VII of FIG. 1.
Figure 8:
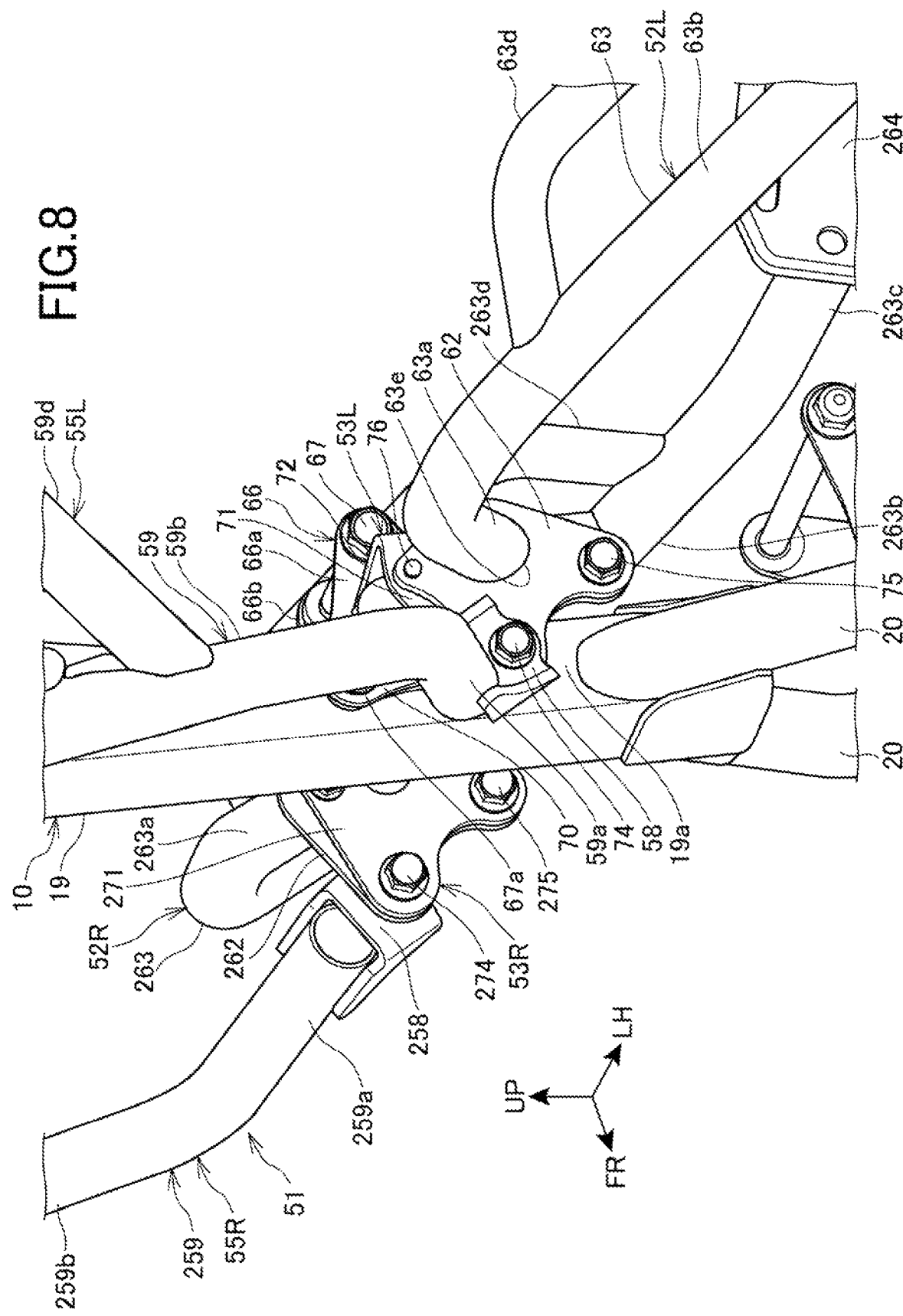
FIG. 8 is a perspective view of a fixing structure for fixing the side guard and the engine guard to the stays as viewed from a left side.

FIG. 7 is a sectional view taken along line VII-VII of FIG. 1. FIG. 8 is a perspective view of a fixing structure for fixing the side guards 55L and 55R and the engine guards 52L and 52R to the stays 53L and 53R as viewed from a left-hand side.

Referring to FIGS. 6 to 8, an engine hanger 66 is provided at a lower portion of the down frame 19.

The engine hanger 66 includes a pair of left and right support plates 66a and 66b extending from left and right side surfaces 19a of the down frame 19 toward the rear side of the down frame 19.

The support plates 66a and 66b are fastened to the down frame 19 by a pair of engine hanger fastening members 67a and 67b (fastening members) inserted in and passed through front portions of the support plates 66a and 66b from a lateral side.

A pair of the upper and lower engine hanger fastening members 67a and 67b are provided with a vertical spacing therebetween.

The engine hanger fastening member 67a includes a single bolt that penetrates upper portions of the support plates 66a and 66b and both left and right side surfaces 19a of the down frame 19 in the transverse direction, and a nut to be screw-engaged with the bolt.

The engine hanger fastening member 67b includes a single bolt that penetrates lower portions of the support plates 66a and 66b and both the left and right side surfaces 19a of the down frame 19 in the transverse direction, and a nut to be screw-engaged with the bolt.

An engine fixing bolt 67 is inserted in and passed through rear portions of the support plates 66a and 66b in the transverse direction.

As depicted in FIG. 7, the engine 11 includes a hanger linking section 30a projecting forward from a front surface of the crankcase 30.

The hanger linking section 30a is disposed between the left and right support plates 66a and 66b, and is linked to the engine hanger 66 by the engine fixing bolt 67 inserted in and passed through the hanger linking section 30a.

Referring to FIGS. 4 and 6 to 8, the stay 53L on the left side includes a plate-shaped frame connection section 70 connected to the down frame 19, a plate-shaped guard member connection section 71 connected to the guard member 50, and a plate-shaped linking section 72 that connects the frame connection section 70 and the guard member connection section 71.

The stay 53L is formed in a U shape by the frame connection section 70 and the guard member connection section 71 that are disposed to face each other, and the linking section 72 that connects an end portion of the frame connection section 70 and an end portion of the guard member connection section 71.

The stay 53L is disposed in an orientation such that the linking section 72 constituting a bottom portion of the U shape faces in the longitudinal vehicle direction. More in detail, the stay 53 is disposed in such an orientation that the linking section 72 constituting the bottom portion of the U shape faces to the vehicle front side. As depicted in FIG. 7, therefore, the stay 53L appears U-shaped when the stay 53L is viewed from above.

The frame connection section 70 of the stay 53L is provided in an upper portion thereof with a fixing hole 70a in and through which the engine hanger fastening member 67a is inserted and passed, and is provided in a lower portion thereof with a fixing hole 70b in and through which the engine hanger fastening member 67b is inserted and passed.

Of the stay 53L, the frame connection section 70 is laid over the support plate 66a of the engine hanger 66 from an outer side, and the frame connection section 70 is fastened to the down frame 19 by the engine hanger fastening members 67a and 67b.

In other words, the stay 53L is co-fastened to the down frame 19 together with the engine hanger 66 by the engine hanger fastening members 67a and 67b. Therefore, the stay 53L can be fixed with a simple structure.

The guard member connection section 71 is disposed to face the frame connection section 70 from the transverse-directionally outer side.

The linking section 72 extends in the transverse direction and links a rear edge of the frame connection section 70 and a rear edge of the guard member connection section 71.

The stay 53L includes a boss section 73 extending from an inner surface of one of the frame connection section 70 and the guard member connection section 71 to an inner surface of the other of the frame connection section 70 and the guard member connection section 71.

In the present embodiment, the boss section 73 extends transverse-directionally inward from the inner surface of the guard member connection section 71 toward the inner surface of the frame connection section 70.

Figure 9:
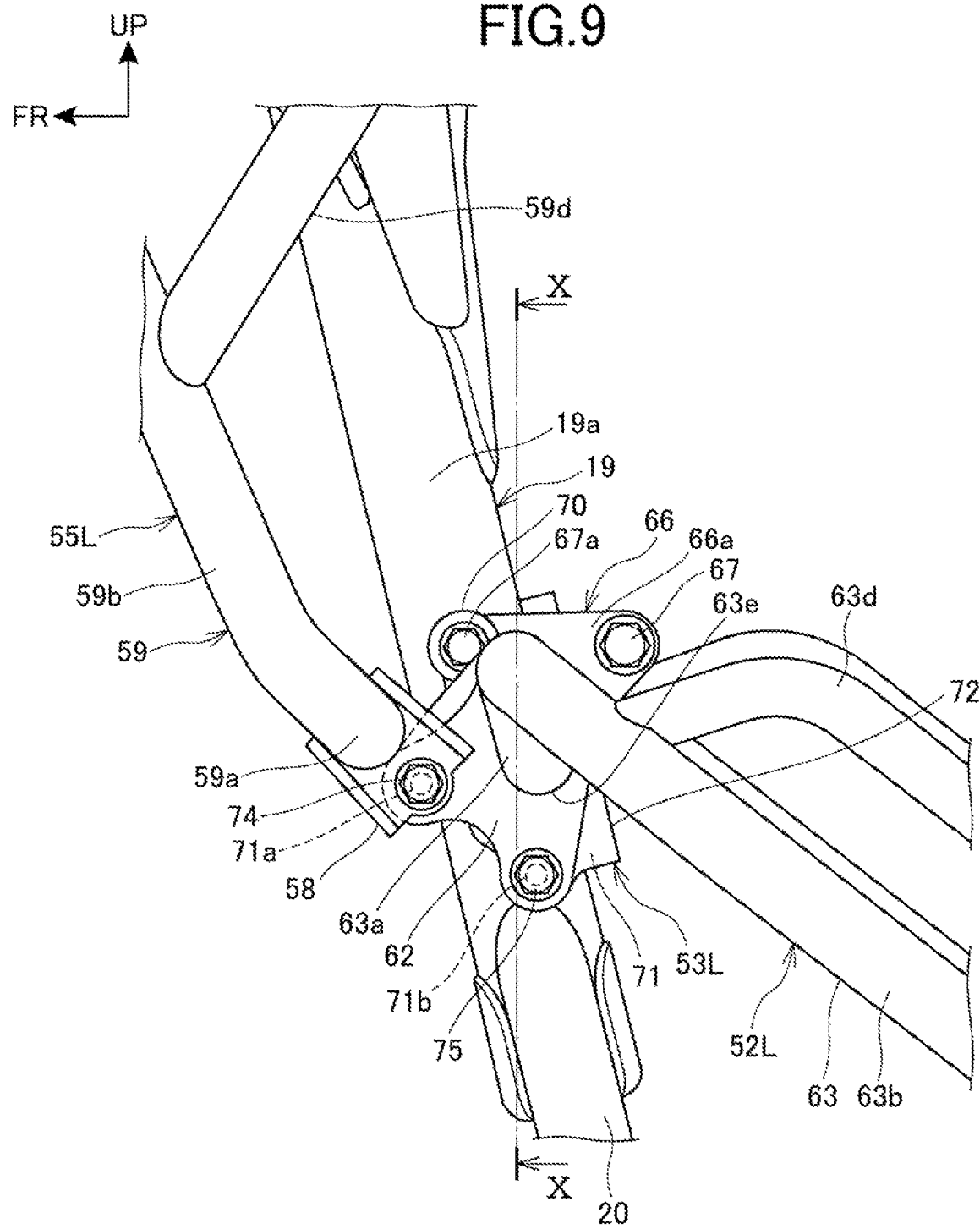
FIG. 9 is a left side view of a peripheral part around the stay on the left side.

FIG. 9 is a left side view of a peripheral part around the stay 53L on the left side.

Referring to FIGS. 4 and 6 to 9, the guard member connection section 71 of the stay 53L includes fixing holes 71a and 71b (FIGS. 4 and 9). Fixtures 74 and 75 that fix the engine guard upper-side mounting section 62 of the engine guard 52L to the stay 53L are inserted in and passed through the fixing holes 71a and 71b.

The fixing hole 71b is located at a lower end portion of the guard member connection section 71, and the fixing hole 71a is located above the fixing hole 71b.

In addition, the guard member connection section 71 includes a stop hole 71c (FIG. 4). A fixture 76 (FIG. 6) that fastens the engine guard upper-side mounting section 62 to the stay 53L is inserted in and passed through the stop hole 71c from the transverse-directionally inner side. The stop hole 71c is located above the fixing hole 71b.

Referring to FIGS. 4 and 5 to 9, the engine guard upper-side mounting section 62 of the engine guard 52L is a plate member laid over an outside surface of the guard member connection section 71 of the stay 53L from an outer side.

The engine guard upper-side mounting section 62 is fixed to the stay 53L by the fixture 75 which is inserted in and passed through a lower portion of the engine guard upper-side mounting section 62 and is fastened to the fixing hole 71b of the guard member connection section 71.

Besides, the engine guard upper-side mounting section 62 is fixed to the stay 53L by the fixture 74 which is inserted in and passed through a front portion of the engine guard upper-side mounting section 62 and is fastened to the fixing hole 71a of the guard member connection section 71. Here, the fixtures 74 and 75 are each composed of a bolt and a nut.

Further, an upper portion of the engine guard upper-side mounting section 62 is fastened to the stay 53L by the fixture 76 which is inserted in and passed through the stop hole 71c of the guard member connection section 71.

The side guard lower-side mounting section 58 of the side guard 55L is laid over an outside surface of the engine guard upper-side mounting section 62 from an outer side, and is fastened to the guard member connection section 71 of the stay 53L by the fixture 75.

In other words, the side guard lower-side mounting section 58 is co-fastened to the stay 53L together with the engine guard upper-side mounting section 62 by the fixture 75. Therefore, the side guard 55L and the engine guard 52L can be fixed to the down frame 19 by the single stay 53L, and the fixing structure can be simplified.

In addition, as depicted in FIG. 3, the lower-side side extension section 59a which is a lower portion of the side guard 55L and the upper-side side extension section 63a which is an upper portion of the engine guard 52L overlap with each other in front view of the vehicle. Therefore, the side guard lower-side mounting section 58 and the engine guard upper-side mounting section 62 are located close to each other, so that the stay 53L is easily shared by the side guard lower-side mounting section 58 and the engine guard upper-side mounting section 62.

Figure 10:
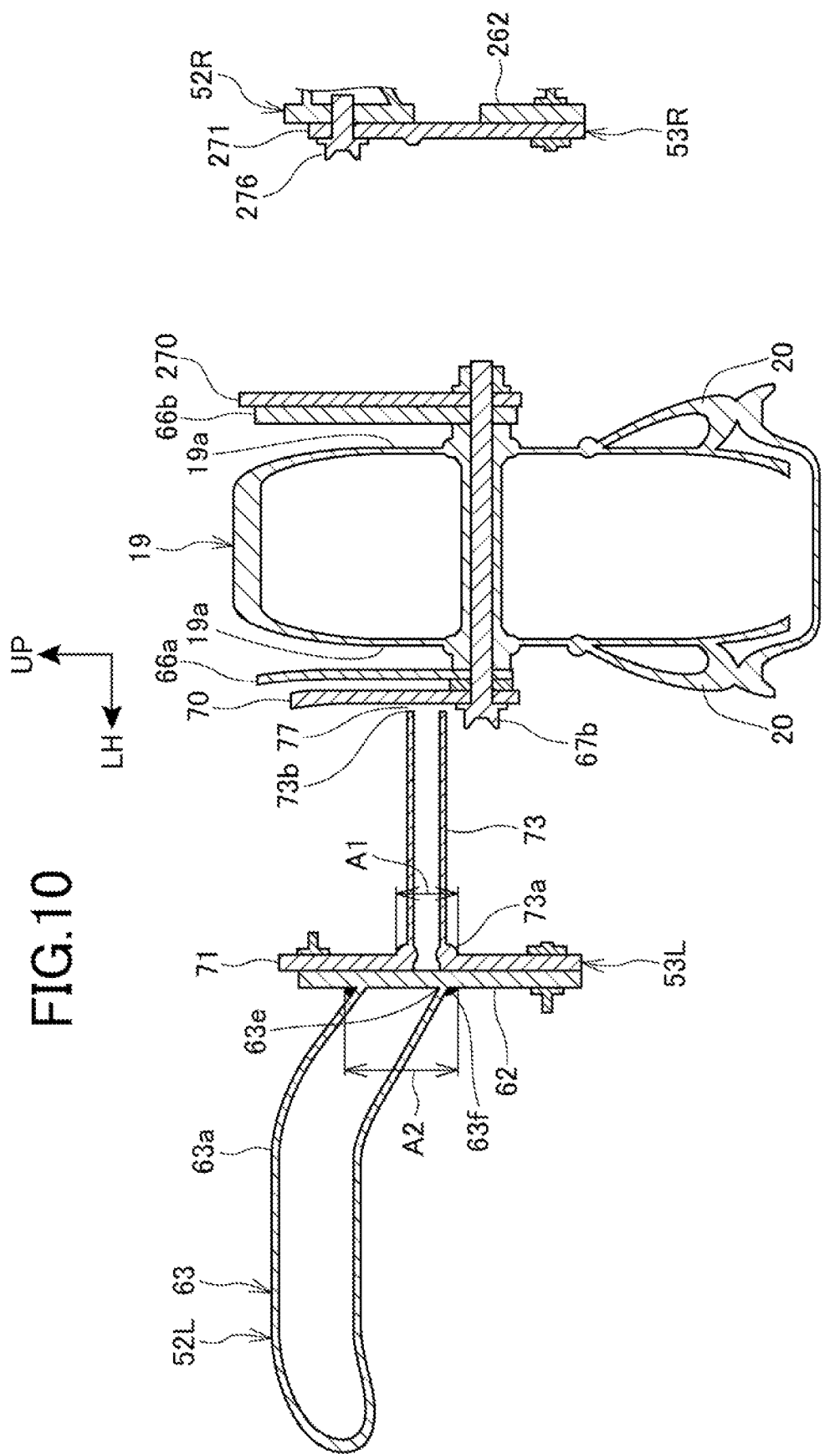
FIG. 10 is a sectional view taken along line X-X of FIG. 9.

FIG. 10 is a sectional view taken along line X-X of FIG. 9.

Referring to FIGS. 6, 9 and 10, the boss section 73 is a cylindrical member extending in the transverse direction, and a base end portion in the axial direction thereof is welded to an inner surface of the guard member connection section 71. A weld bead 73a welding the boss section 73 to the guard member connection section 71 is in an annular shape along an outer periphery of the boss section 73.

A gap 77 of a predetermined size is provided between a tip 73b of the boss section 73 and an inner surface of the frame connection section 70.

A base section 63e of the upper-side side extension section 63a of the engine guard 52L with respect to the engine guard upper-side mounting section 62 is welded to an outside surface of the engine guard upper-side mounting section 62 of the stay 53L.

A weld bead 63f welding the base section 63e to the engine guard upper-side mounting section 62 is in an annular shape along an outer periphery of the upper-side side extension section 63a.

The base section 63e of the engine guard 52L overlaps with the boss section 73, as viewed in the axial direction of the boss section 73. Here, the weld bead 63f is included in the base section 63e, and the weld bead 73a is included in the boss section 73.

More in detail, as viewed in the axial direction of the boss section 73, an area A1 surrounded by an outer peripheral edge of the weld bead 73a of the boss section 73 and an area A2 surrounded by an outer peripheral edge of the weld bead 63f of the base section 63e overlap with each other at least partly.

In addition, the boss section 73 and the base section 63e are disposed between the engine hanger fastening member 67a on the upper side and the engine hanger fastening member 67b on the lower side, in the vertical direction, in side view of the vehicle.

Further, the fixture 74 that fixes the side guard lower-side mounting section 58 to the stay 53L is also located between the engine hanger fastening member 67a and the engine hanger fastening member 67b, in the vertical direction.

Referring to FIGS. 4 and 6 to 8, the stay 53R on the right side includes a plate-shaped frame connection section 270 connected to the down frame 19, a plate-shaped guard member connection section 271 connected to the guard member 50, and a plate-shaped linking section 272 that connects the frame connection section 270 and the guard member connection section 271.

The stay 53R is formed in a U shape by the frame connection section 270 and the guard member connection section 271 which are disposed to face each other, and the linking section 272 that connects an end portion of the frame connection section 270 and an end portion of the guard member connection section 271.

The stay 53R is disposed in an orientation such that the linking section 272 constituting a bottom portion of the U shape faces in the longitudinal vehicle direction. More in detail, the stay 53R is disposed in such an orientation that the linking section 272 constituting the bottom portion of the U shape faces to the front side of the vehicle. Therefore, the stay 53R appears U-shaped when the stay 53R is viewed from above, as depicted in FIG. 7.

The frame connection section 270 of the stay 53R is provided in an upper portion thereof with a fixing hole 270a in and through which the engine hanger fastening member 67a is inserted and passed, and is provided in a lower portion thereof with a fixing hole 270b in and through which the engine hanger fastening member 67b is inserted and passed.

Of the stay 53R, the frame connection section 270 is laid over the support plate 66b of the engine hanger 66 from an outer side, and the frame connection section 270 is fastened to the down frame 19 by the engine hanger fastening members 67a and 67b.

In other words, the stay 53R is co-fastened to the down frame 19 together with the engine hanger 66 by the engine hanger fastening members 67a and 67b. Therefore, the stay 53R can be fixed with a simple structure.

In addition, the stays 53L and 53R are fixed to the down frame 19 by the engine hanger fastening members 67a and 67b. Therefore, the engine hanger fastening members 67a and 67b can be shared by the left and right stays 53L and 53R, so that the fixing structure can be simplified.

The guard member connection section 271 is disposed to face the frame connection section 270 from the transverse-directionally outer side.

The linking section 272 extends in the transverse direction, and links a rear edge of the frame connection section 270 and a rear edge of the guard member connection section 271.

The stay 53R includes a boss section 273 that extends from an inner surface of one of the frame connection section 270 and the guard member connection section 271 to an inner surface of the other of the frame connection section 270 and the guard member connection section 271.

In the present embodiment, the boss section 273 extends from the inner surface of the guard member connection section 271 toward the inner surface of the frame connection section 270.

Figure 11:
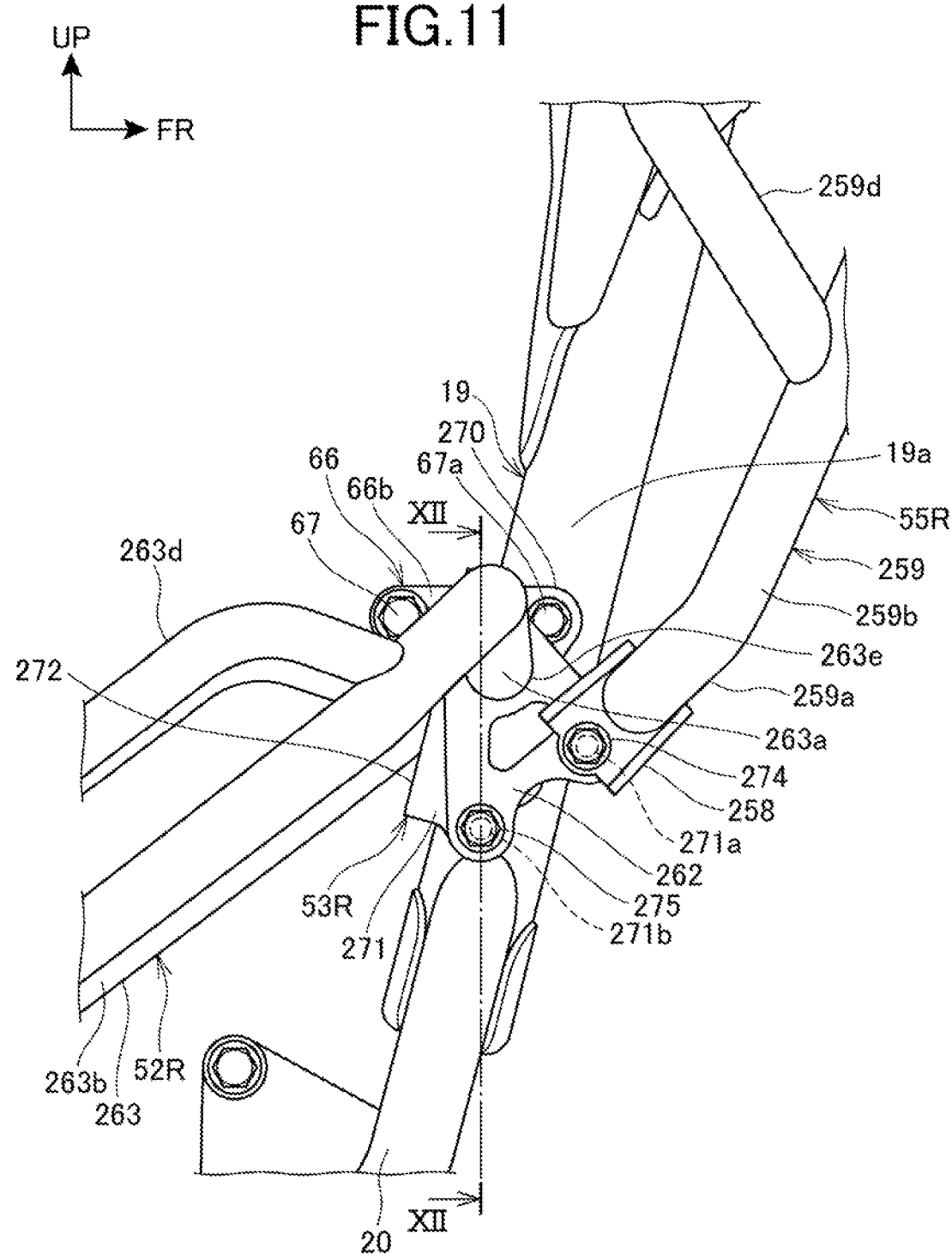
FIG. 11 is a right side view of a peripheral part around the stay on the right side.

FIG. 11 is a right side view of a peripheral part around the stay 53R on the right side.

Referring to FIGS. 4, 6 to 8, and 11, the guard member connection section 271 of the stay 53R includes fixing holes 271a and 271b (FIG. 11). In and through the fixing holes 271a and 271b, fixtures 274 and 275 that fasten the engine guard upper-side mounting section 262 of the engine guard 52R to the stay 53R are inserted and passed.

The fixing hole 271b is located at a lower end portion of the guard member connection section 271, and the fixing hole 271a is located above the fixing hole 271b.

In addition, the guard member connection section 271 includes a stop hole 271c (FIG. 4). In and through the stop hole 271c, a fixture 276 (FIG. 6) that fastens the engine guard upper-side mounting section 262 to the stay 53R is inserted and passed from the transverse-directionally inner side. The stop hole 271c is located above the fixing hole 271b.

The engine guard upper-side mounting section 262 of the engine guard 52R is a plate member laid over an outside surface of the guard member connection section 271 of the stay 53R from an outer side.

The engine guard upper-side mounting section 262 is fixed to the stay 53R by the fixture 275 that is inserted in and passed through a lower portion of the engine guard upper-side mounting section 262 and is fastened to the fixing hole 271b of the guard member connection section 271.

In addition, the engine guard upper-side mounting section 262 is fixed to the stay 53R by the fixture 274 which is inserted in and passed through a front portion of the engine guard upper-side mounting section 262 and is fastened to the fixing hole 271a of the guard member connection section 271. Here, the fixtures 274 and 275 are each composed of a bolt and a nut.

Further, an upper portion of the engine guard upper-side mounting section 262 is fastened to the stay 53R by the fixture 276 (FIG. 6) which is inserted in and passed through the stop hole 271c of the guard member connection section 271.

The side guard lower-side mounting section 258 of the side guard 55R is laid over an outside surface of the engine guard upper-side mounting section 262 from an outer side, and is fastened to the guard member connection section 271 of the stay 53R by the fixture 275.

In other words, the side guard lower-side mounting section 258 is co-fastened to the stay 53R together with the engine guard upper-side mounting section 262 by the fixture 275. Therefore, the side guard 55R and the engine guard 52R can be fixed to the down frame 19 by the single stay 53R, so that the fixing structure can be simplified.

In addition, as depicted in FIG. 3, in front view of the vehicle, the lower-side side extension section 259a which is a lower portion of the side guard 55R and the upper-side side extension section 263a which is an upper portion of the engine guard 52R overlap with each other. Therefore, the side guard lower-side mounting section 258 and the engine guard upper-side mounting section 262 are located close to each other, and the stay 53R is easily shared by the side guard lower-side mounting section 258 and the engine guard upper-side mounting section 262.

Figure 12:
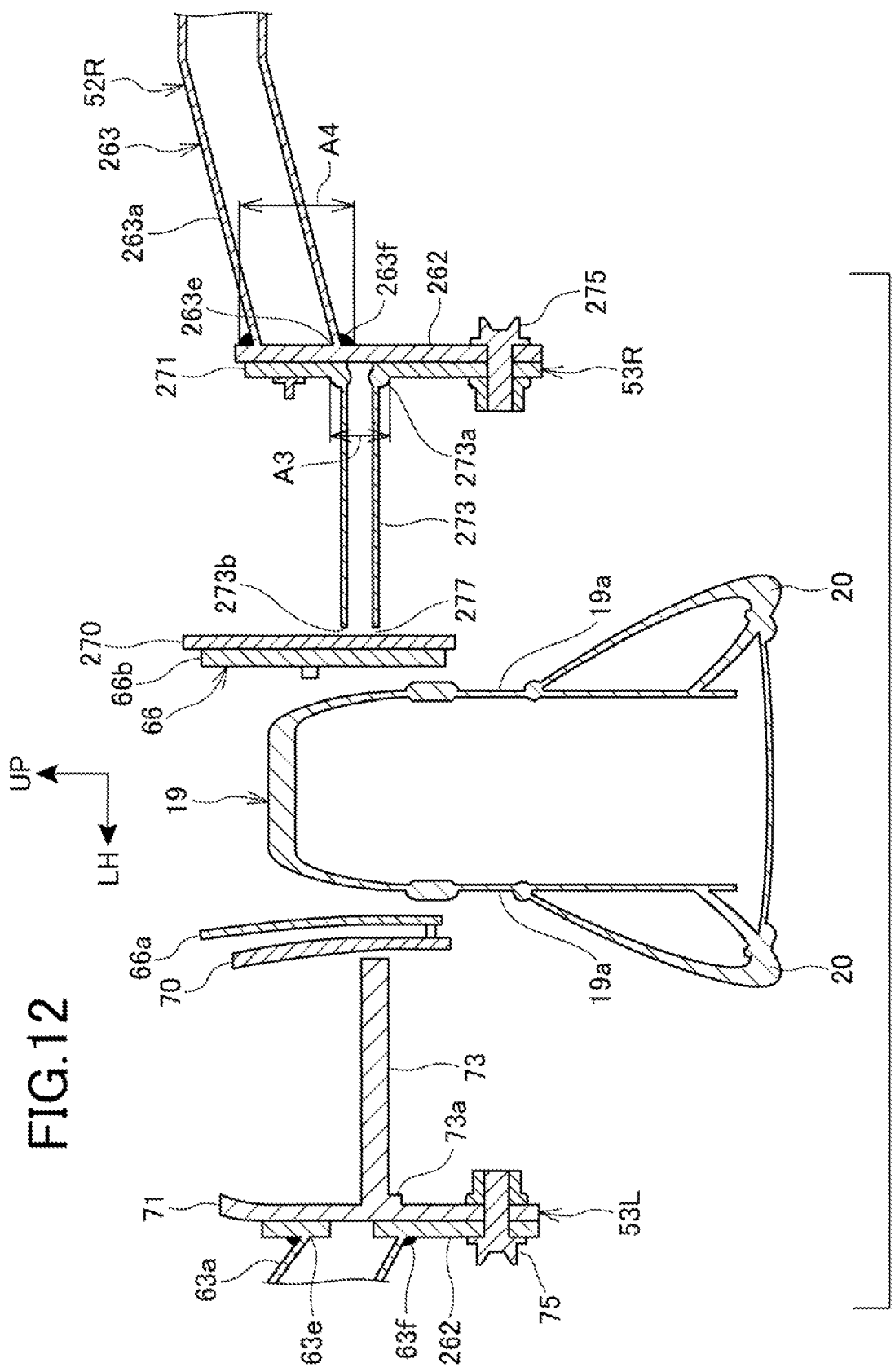
FIG. 12 is a sectional view taken along line XII-XII of FIG. 11.

FIG. 12 is a sectional view taken alone line XII-XII of FIG. 11.

Referring to FIGS. 6, 11 and 12, the boss section 273 is a cylindrical member extending in the transverse direction, and a base end portion in the axial direction thereof is welded to an inner surface of the guard member connection section 271. A weld bead 273a welding the boss section 273 to the guard member connection section 271 is in an annular shape along an outer periphery of the boss section 273.

A gap 277 of a predetermined size is provided between a tip 273b of the boss section 273 and an inner surface of the frame connection section 270.

A base section 263e of the upper-side side extension section 263a of the engine guard 52R with respect to the engine guard upper-side mounting section 262 is welded to an outside surface of the engine guard upper-side mounting section 262 of the stay 253L.

A weld bead 263f welding the base section 263e to the engine guard upper-side mounting section 262 is in an annular shape along an outer periphery of the upper-side side extension section 263a.

The base section 263e of the engine guard 52R overlaps with the boss section 273 as viewed in the axial direction of the boss section 273. Here, the weld bead 263f is included in the base section 263e, and the weld bead 273a is included in the boss section 273.

More in detail, as viewed in the axial direction of the boss section 273, an area A3 surrounded by an outer peripheral edge of the weld bead 273a of the boss section 273 and an area A4 surrounded by an outer peripheral edge of the weld bead 263f of the base section 263a overlap with each other at least partly.

In addition, the boss section 273 and the base section 263e are located between the engine hanger fastening member 67a on the upper side and the engine hanger fastening member 67b on the lower side, in the vertical direction, in side view of the vehicle.

Further, the fixture 274 that fixes the side guard lower-side mounting section 258 to the stay 53R is also located between the engine hanger fastening member 67a and the engine hanger fastening member 67b in the vertical direction.

Part of an external force acting on the guard member 50 is transmitted to the down frame 19 through the stays 53L and 53R.

Since the stay 53L is U-shaped in the present embodiment, when an external force acts thereon, the stay 53L is bent to a comparatively large extent in such a manner as to mainly vary the distance between the frame connection section 70 and the guard member connection section 71.

In addition, the stay 53R is similarly bent to a comparatively large extent by an external force in such a manner as to vary the distance between the frame connection section 270 and the guard member connection section 271.

Therefore, even when the guard member 50 is fixed to the body frame 10, the rigidity of the body frame 10 is prevented from being made excessively high by the guard member 50.

In the case where the stay 53L is bent to a large extent in the transverse direction by an external force, the gap 77 is reduced to zero and the tip 73b of the boss section 73 comes into contact with the inner surface of the frame connection section 70, whereby deformation of the stay 53L is restricted.

In addition, in the case where the stay 53R is bent to a large extent in the transverse direction by an external force, the gap 277 is reduced to zero and the tip 273b of the boss section 273 comes into contact with the inner surface of the frame connection section 270, whereby deformation of the stay 53R is restricted.

Therefore, in the case where a large external force is exerted on the guard member 50, deformation of the stays 53L and 53R can be prevented by the boss sections 73 and 273.

Further, the boss section 73 of the stay 53L overlaps with the base section 63e of the engine guard 52L, as viewed in the axial direction thereof. Similarly, the boss section 273 of the stay 53R overlaps with the base section 263e of the engine guard 52R, as viewed in the axial direction thereof. Therefore, external forces exerted on the stays 53L and 53R from the engine guards 52L and 52R can be efficiency received by the boss sections 73 and 273, so that excessive deformation of the stays 53L and 53R can be prevented.

As depicted in FIG. 7, the pair of left and right exhaust pipes 32a extending downward from the cylinder section 31 are passed inside the U-shaped stays 53L and 53R.

In other words, the exhaust pipes 32a are passed between the frame connection section 70 and the guard member connection section 71 and between the frame connection section 270 and the guard member connection section 271. Therefore, the exhaust pipes 32a can be disposed in a compact fashion by utilizing spaces inside the stays 53L and 53R.

As has been described above, according to the embodiment of the present invention, the guard structure for the motorcycle 1 includes the body frame 10, the guard member 50 fixed to the body frame 10 and guarding the vehicle body, and the stays 53L and 53R that connect the guard member 50 to the body frame 10. The stays 53L and 53R include the frame connection sections 70 and 270 connected to the body frame 10 side, the guard member connection sections 71 and 271 connected to the guard member 50, and the linking sections 72 and 272 that connect the frame connection sections 70 and 270 to the guard member connection sections 71 and 271. The stays 53L and 53R are each formed in a U shape by the frame connection sections 70 and 270 and the guard member connection sections 71 and 271 which are disposed to face each other and the linking sections 72 and 272.

According to this configuration, since the stays 53L and 53R are U-shaped and can be bent appropriately, the rigidity of the body frame 10 is prevented from being made excessively high by the guard member 50. Therefore, even in the configuration in which the guard member 50 is provided, the rigidity of the body frame 10 can be made suitable.

In addition, the boss sections 73 and 273 extending from the inner surfaces of the guard member connection sections 71 and 271 to the inner surfaces of the frame connection sections 70 and 270 are provided, and the gaps 77 and 277 are provided between the tips 73b and 273b of the boss sections 73 and 273 and the inner surfaces of the frame connection sections 70 and 270.

This configuration ensures that although the stays 53L and 53R are deformed by amounts corresponding to the gaps 77 and 277 between the tips 73b and 273b of the boss sections 73 and 273 and the inner surfaces of the frame connection sections 70 and 270, deformation of the stays 53L and 53R is restricted by the boss sections 73 and 273 in a state in which the gaps 77 and 277 are eliminated. Therefore, the rigidity of the body frame 10 can be made suitable by utilizing the deformation of the stays 53L and 53R, and deformation of the stays 53L and 53R can be prevented from occurring in the case where a large external force is exerted on the guard member 50.

In addition, the guard member 50 includes the rod-shaped guard main body sections 63 and 263, and the engine guard upper-side mounting sections 62 and 262 that are provided at ends of the guard main body sections 63 and 263 and are fixed to the guard member connection sections 71 and 271. The base sections 63e and 263e of the guard main body sections 63 and 263 with respect to the engine guard upper-side mounting sections 62 and 262 overlap with the boss sections 73 and 273 at least partly, as viewed in the axial directions of the boss sections 73 and 273.

According to this configuration, the base sections 63e and 263e of the guard main body sections 63 and 263 can be directly received by the boss sections 73 and 273, external forces transmitted from the guard main body sections 63 and 263 to the stays 53L and 53R can be effectively received by the boss sections 73 and 273.

Further, the guard member 50 includes at least either of the side guards 55L and 55R provided on lateral sides of a front portion of the body frame 10 and the engine guards 52L and 52R provided on lateral sides of the engine 11 of the motorcycle 1.

According to this configuration, a front portion of the body frame 10 and the engine 11 can be protected from lateral sides, and the rigidity of the front portion of the body frame 10 can be made suitable, by the guard member 50.

In addition, the side guards 55L and 55R are disposed above the engine guards 52L and 52R; the guard member 50 includes the side guard lower-side mounting sections 58 and 258 that fix lower portions of the side guards 55L and 55R to the stays 53L and 53R, and the engine guard upper-side mounting sections 62 and 262 that fix upper portions of the engine guards 52L and 52R to the stays 53L and 53R; and the side guard lower-side mounting sections 58 and 258 and the engine guard upper-side mounting sections 62 and 262 are co-fastened to the same stays 53L and 53R.

According to this configuration, the stays 53L and 53R can be shared by the side guards 55L and 55R and the engine guards 52L and 52R, so that the number of component parts can be reduced.

In addition, the side guards 55L and 55R and the engine guards 52L and 52R overlap with each other, in front view of the vehicle.

According to this configuration, the side guards 55L and 55R and the engine guards 52L and 52R are located close to each other, and, therefore, the stays 53L and 53R are easily shared by the side guards 55L and 55R and the engine guards 52L and 52R.

In addition, the body frame 10 includes the head pipe 16, the main frames 17 extending rearward from the head pipe 16, and the down frame 19 extending downward from the head pipe 16; the stays 53L and 53R are provided in a pair on the left and right sides of the down frame 19, and are each disposed in such an orientation that the linking sections 72 and 272 constituting the bottom portion of the U shape face in the longitudinal vehicle direction; and the left and right stays 53L and 53R are fastened to the down frame 19 by a pair of upper and lower engine hanger fastening members 67a and 67b that penetrate the frame connection sections 70 and 270 and the down frame 19 in the left-right direction.

According to this configuration, the left and right stays 53L and 53R can be firmly fixed to the down frame 19 by the pair of upper and lower engine hanger fastening members 67a and 67b that penetrate the frame connection sections 70 and 270 and the down frame 19 in the left-right direction.

In addition, the boss sections 73 and 273 and the base sections 63e and 263e are provided between the upper and lower engine hanger fastening members 67a and 67b.

According to this configuration, an external force acting on the guard member 50 acts on a part between the engine hanger fastening members 67a and 67b through the boss sections 73 and 273. Therefore, the moment due to the external force can be restrained from strongly acting on the stays 53L and 53R.

In addition, the body frame 10 includes the head pipe 16, the main frames 17 extending rearward from the head pipe 16, and the down frame 19 extending downward from the head pipe 16; the guard member 50 includes the side guard upper-side mounting section 57b that fixes upper portions of the side guards 55L and 55R to the body frame 10, and the engine guard lower-side mounting sections 64 and 264 that fix lower portions of the engine guards 52L and 52R to the body frame 10; the side guard upper-side mounting section 57b is fixed to the head pipe 16; and the engine guard lower-side mounting sections 64 and 264 are fixed to those portions of the body frame 10 which are located on the rear side relative to the down frame 19. Here, the engine guard lower-side mounting section 64 is fixed to the lower frame 20 on the rear side of the down frame 19, while the engine guard lower-side mounting section 264 is fixed to the pivot frame 18 on the rear side of the down frame 19.

According to this configuration, the rigidity of the body frame 10 ranging from the head pipe 16 to that portion of the body frame 10 which is located on the rear side relative to the down frame 19 can be made suitable by the stays 53L and 53R.

Further, the stays 53L and 53R are fixed to the down frame 19 between the side guard upper-side mounting section 57b and the engine guard lower-side mounting sections 64 and 264.

According to this configuration, since the stays 53L and 53R are located between the side guard upper-side mounting section 57b and the engine guard lower-side mounting sections 64 and 264, the body frame 10 can be provided with suitable rigidity over a wide range thereof.

In addition, the engine hanger 66 that supports the engine 11 of the motorcycle 1 is fastened to the body frame 10, and the stays 53L and 53R are co-fastened to the body frame 10 together with the engine hanger 66.

According to this configuration, the stays 53L and 53R can be fixed to the body frame 10 with a simple structure, utilizing the fastening section of the engine hanger 66.

Note that the above embodiment merely depicts a mode of the present invention, and the present invention is not limited by the above embodiment.

In the above embodiment, it has been described that the boss sections 73 and 273 extend from the inner surfaces of the guard member connection sections 71 and 271 to the inner surfaces of the frame connection sections 70 and 270, but this is not limitative of the present invention. The boss section may extend from the inner surfaces of the frame connection sections 70 and 270 to the inner surfaces of the guard member connection sections 71 and 271, and gaps may be provided between tips of the boss sections 73 and 273 and the inner surfaces of the guard member connection sections 71 and 271.

In addition, in the above embodiment, it has been described that the side guards 55L and 55R and the engine guards 52L and 52R are co-fastened to the same stays 53L and 53R, but this is not restrictive of the present invention. For example, only either of the side guards 55L and 55R or the engine guards 52L and 52R may be fixed to the stays 53L and 53R.

In the above embodiment, description has been made by taking the motorcycle 1 as an example of the saddle riding vehicle, but this is not limitative of the present invention. The present invention is applicable to three-wheeled saddle riding vehicles having two front wheels or two rear wheels, and to saddle riding vehicles having four or more wheels.

DESCRIPTION OF REFERENCE SYMBOLS

1 Motorcycle (Saddle riding vehicle)
10 Body frame
11 Engine
16 Head pipe
17 Main frame
18 Pivot frame (that portion of the body frame which is located on the rear side relative to the down frame)
19 Down frame
20 Lower frame (that portion of the body frame which is located on the rear side relative to the down frame)
50 Guard member
52L, 52R Engine guard
53L, 53R Stay
55L, 55R Side guard
57b Side guard upper-side mounting section
58, 258 Side guard lower-side mounting section
62, 262 Engine guard upper-side mounting section (Mounting section)
63, 263 Guard main body section
63e, 263e Base section
64, 264 Engine guard lower-side mounting section
66 Engine hanger
67a, 67b Engine hanger fastening member (Fastening member)
70, 270 Frame connection section
71, 271 Guard member connection section
72, 272 Linking section
73, 273 Boss section
73b, 273b Tip
77, 277 Gap

The invention claimed is:

1. A guard structure for a saddle riding vehicle, comprising:
a body frame;
a guard member fixed to the body frame and guarding a vehicle body; and
a stay connecting the guard member to the body frame,
wherein the stay includes a frame connection section connected to a side of the body frame, a guard member connection section connected to the guard member, and a linking section connecting the frame connection section and the guard member connection section, and
the stay is formed in a U shape by the frame connection section and the guard member connection section, which are disposed to face each other, and the linking section,
wherein a boss section extending from an inner surface of one of the frame connection section and the guard member connection section to an inner surface of the other of the frame connection section and the guard member connection section is provided, and
a gap is provided between a tip of the boss section and the inner surface of the other of the frame connection section and the guard member connection section.

2. The guard structure for a saddle riding vehicle according to claim 1,
wherein the guard member includes a rod-shaped guard main body section, and a mounting section provided at an end of the guard main body section and fixed to the guard member connection section, and
a base section of the guard main body section with respect to the mounting section overlaps with the boss section at least partly as viewed in an axial direction of the boss section.

3. The guard structure for a saddle riding vehicle according to claim 1,
wherein the guard member includes at least either one of a side guard provided on a lateral side of a front portion of the body frame, or an engine guard provided on a lateral side of an engine of the saddle riding vehicle.

4. A guard structure for a saddle riding vehicle, comprising:
a body frame;
a guard member fixed to the body frame and guarding a vehicle body; and
a stay connecting the guard member to the body frame,
wherein the stay includes a frame connection section connected to a side of the body frame, a guard member connection section connected to the guard member, and a linking section connecting the frame connection section and the guard member connection section, and
the stay is formed in a U shape by the frame connection section and the guard member connection section, which are disposed to face each other, and the linking section,
wherein the guard member includes at least either one of a side guard provided on a lateral side of a front portion of the body frame, or an engine guard provided on a lateral side of an engine of the saddle riding vehicle,
wherein the side guard is disposed above the engine guard,
the guard member includes a side guard lower-side mounting section that fixes a lower portion of the side guard to the stay, and an engine guard upper-side mounting section that fixes an upper portion of the engine guard to the stay, and
the side guard lower-side mounting section and the engine guard upper-side mounting section are co-fastened to the same stay.

5. The guard structure for a saddle riding vehicle according to claim 4,
wherein the side guard and the engine guard overlap with each other in front view of the vehicle.

6. A guard structure for a saddle riding vehicle, comprising:
a body frame;
a guard member fixed to the body frame and guarding a vehicle body; and
a stay connecting the guard member to the body frame,
wherein the stay includes a frame connection section connected to a side of the body frame, a guard member connection section connected to the guard member, and a linking section connecting the frame connection section and the guard member connection section, and the stay is formed in a U shape by the frame connection section and the guard member connection section, which are disposed to face each other, and the linking section, wherein the body frame includes a head pipe, a main frame extending rearward from the head pipe, and a down frame extending downward from the head pipe, a pair of the stays are provided on left and right sides of the down frame, and are each disposed in such an orientation that the linking section constituting a bottom portion of the U shape faces in a longitudinal vehicle direction, and the left and right stays are fastened to the down frame by a pair of upper and lower fastening members that penetrate the frame connection section and the down frame in a left-right direction.

7. The guard structure for a saddle riding vehicle according to claim 2, wherein the body frame includes a head pipe, a main frame extending rearward from the head pipe, and a down frame extending downward from the head pipe, a pair of the stays are provided on left and right sides of the down frame, and are each disposed in such an orientation that the linking section constituting a bottom portion of the U shape faces in a longitudinal vehicle direction, the left and right stays are fastened to the down frame by a pair of upper and lower fastening members that penetrate the frame connection section and the down frame in a left-right direction, and the boss section and the base section are provided between the upper and lower fastening members in side view of the vehicle.

8. The guard structure for a saddle riding vehicle according to claim 4, wherein the body frame includes a head pipe, a main frame extending rearward from the head pipe, and a down frame extending downward from the head pipe, the guard member includes a side guard upper-side mounting section that fixes an upper portion of the side guard to the body frame, and an engine guard lower-side mounting section that fixes a lower portion of the engine guard to the body frame, and the side guard upper-side mounting section is fixed to the head pipe, while the engine guard lower-side mounting section is fixed to a part of the body frame which is located on a rear side relative to the down frame.

9. The guard structure for a saddle riding vehicle according to claim 8, wherein the stay is fixed to the down frame between the side guard upper-side mounting section and the engine guard lower-side mounting section.

10. A guard structure for a saddle riding vehicle, comprising:

a body frame;

a guard member fixed to the body frame and guarding a vehicle body; and a stay connecting the guard member to the body frame, wherein the stay includes a frame connection section connected to a side of the body frame, a guard member connection section connected to the guard member, and a linking section connecting the frame connection section and the guard member connection section, and the stay is formed in a U shape by the frame connection section and the guard member connection section, which are disposed to face each other, and the linking section, wherein an engine hanger that supports an engine of the saddle riding vehicle is fastened to the body frame, and the stay is co-fastened to the body frame together with the engine hanger.

\* \* \* \* \*